(12) United States Patent
Turner

(10) Patent No.: US 7,114,280 B2
(45) Date of Patent: Oct. 3, 2006

(54) ILLUMINATING SCENT RELEASE FISHING LURE

(75) Inventor: Randal Scott Turner, 3528 Alyson Dr., Ganite Falls, WA (US) 98252

(73) Assignee: Randal Scott Turner, Granite Falls, WA (US)

( * ) Notice: Subject to any disclaimer, the term of this patent is extended or adjusted under 35 U.S.C. 154(b) by 44 days.

(21) Appl. No.: 10/711,850

(22) Filed: Oct. 8, 2004

(65) Prior Publication Data

US 2006/0075676 A1    Apr. 13, 2006

(51) Int. Cl.
*A01K 75/02* (2006.01)
(52) U.S. Cl. ........................................ 43/17.6; 43/42.06
(58) Field of Classification Search .................. 43/17.6, 43/17.5, 42, 42.06, 42.35
See application file for complete search history.

(56) References Cited

U.S. PATENT DOCUMENTS 4,823,497 A * 4/1989 Pierce ......................... 43/17.6
5,172,510 A * 12/1992 Lovell, Jr. ................. 43/42.36
5,471,780 A * 12/1995 Hopson ..................... 43/42.06
6,098,331 A * 8/2000 Kim et al. .................... 43/4.5
6,668,482 B1 * 12/2003 Ruffin et al. ............... 43/42.06
6,941,696 B1 * 9/2005 Kato ......................... 43/42.24

* cited by examiner

*Primary Examiner*—Son T. Nguyen
*Assistant Examiner*—Bethany L Griles

(57) ABSTRACT

A fishing lure having a durable plastic outer shell with lead weights within and that has two hollow tubular chambers. The main chamber is translucent and holds a chemiluminescent chemical stick that illuminates the chamber. The second, bottom chamber in the tail holds fish attractant oil and a sponge-like material that retains the oil. A hole at the top of the chamber allows water to enter into the chamber. The water mixes with the oil and is then dispensed from a second hole at the bottom of the chamber. The tail portion further includes tail fins that are curved causing the lure to spin when retrieved and can be connected with the top cap of the lure to form a separate scent releasing lure without the chemiluminescent chamber being used.

7 Claims, 4 Drawing Sheets

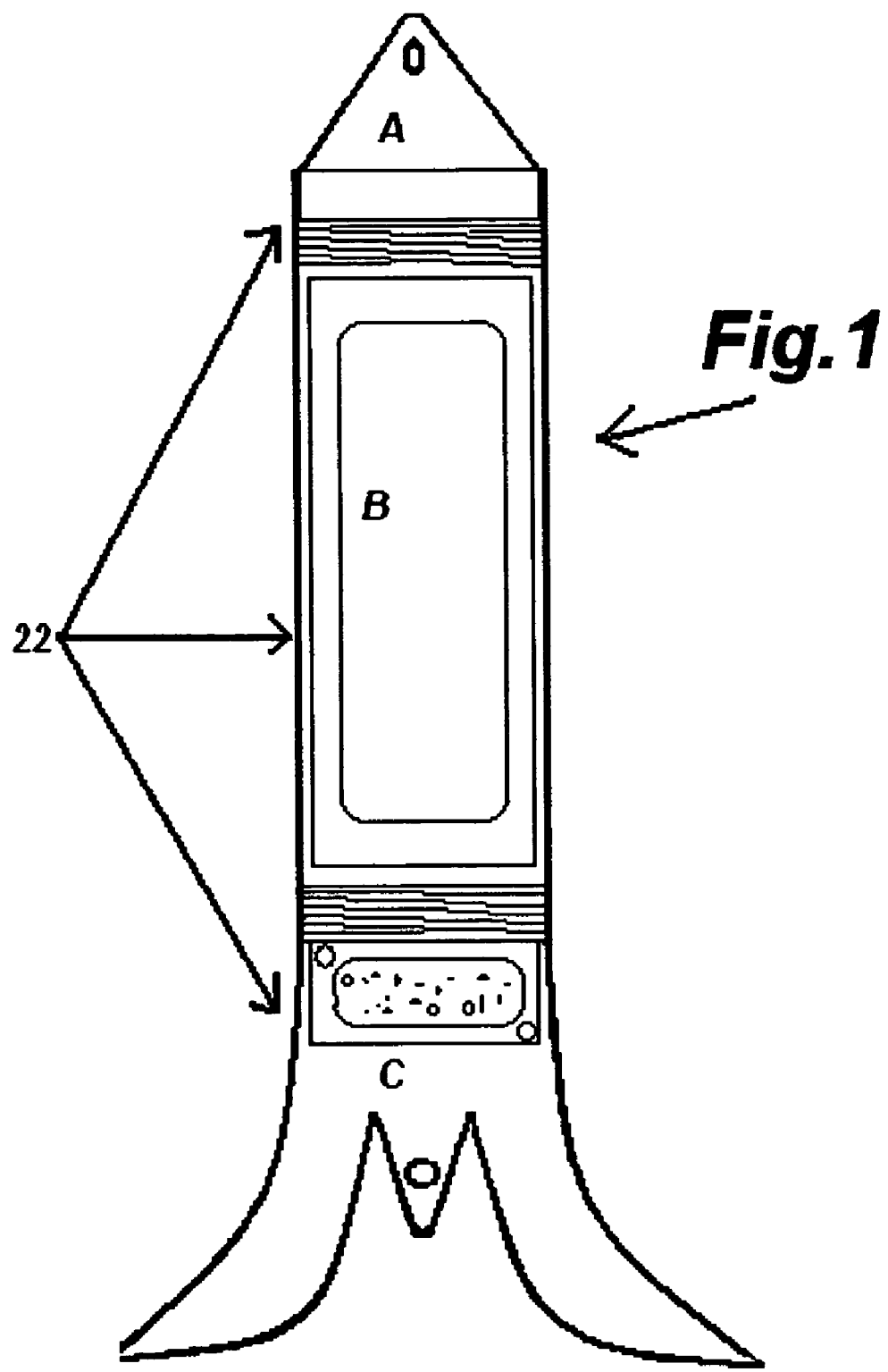

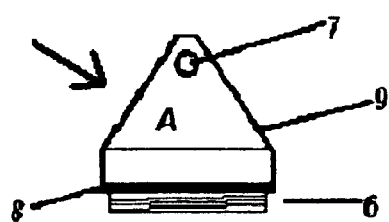
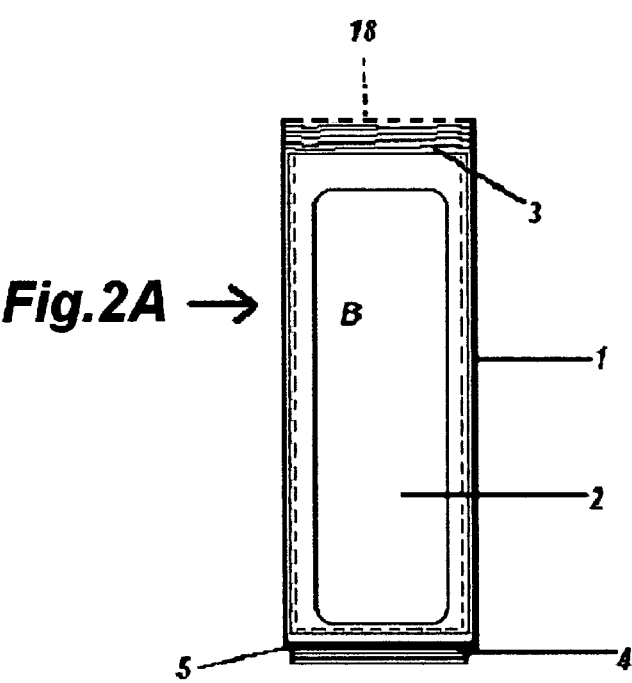
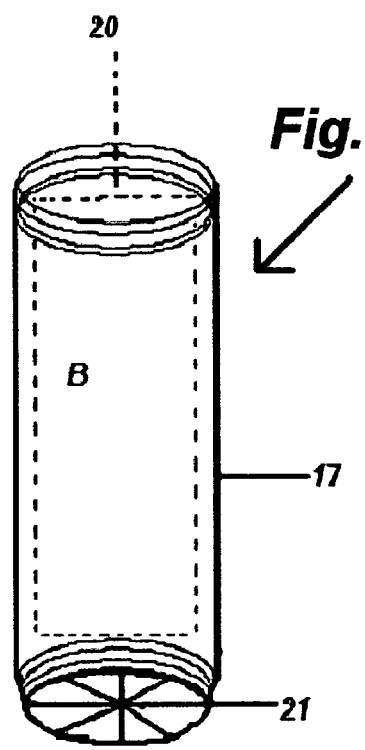

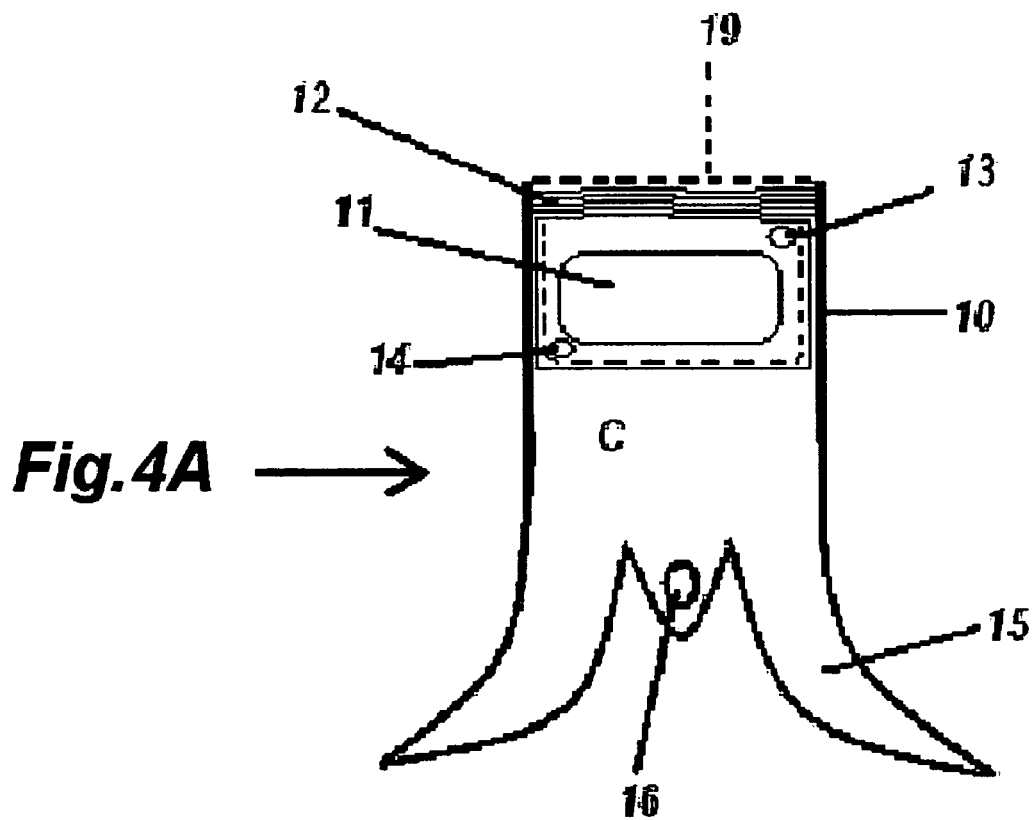
Fig.4A →
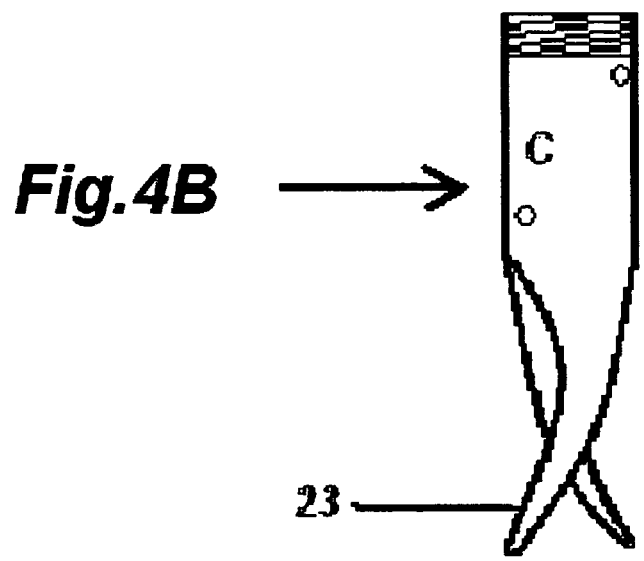
Fig.4B →

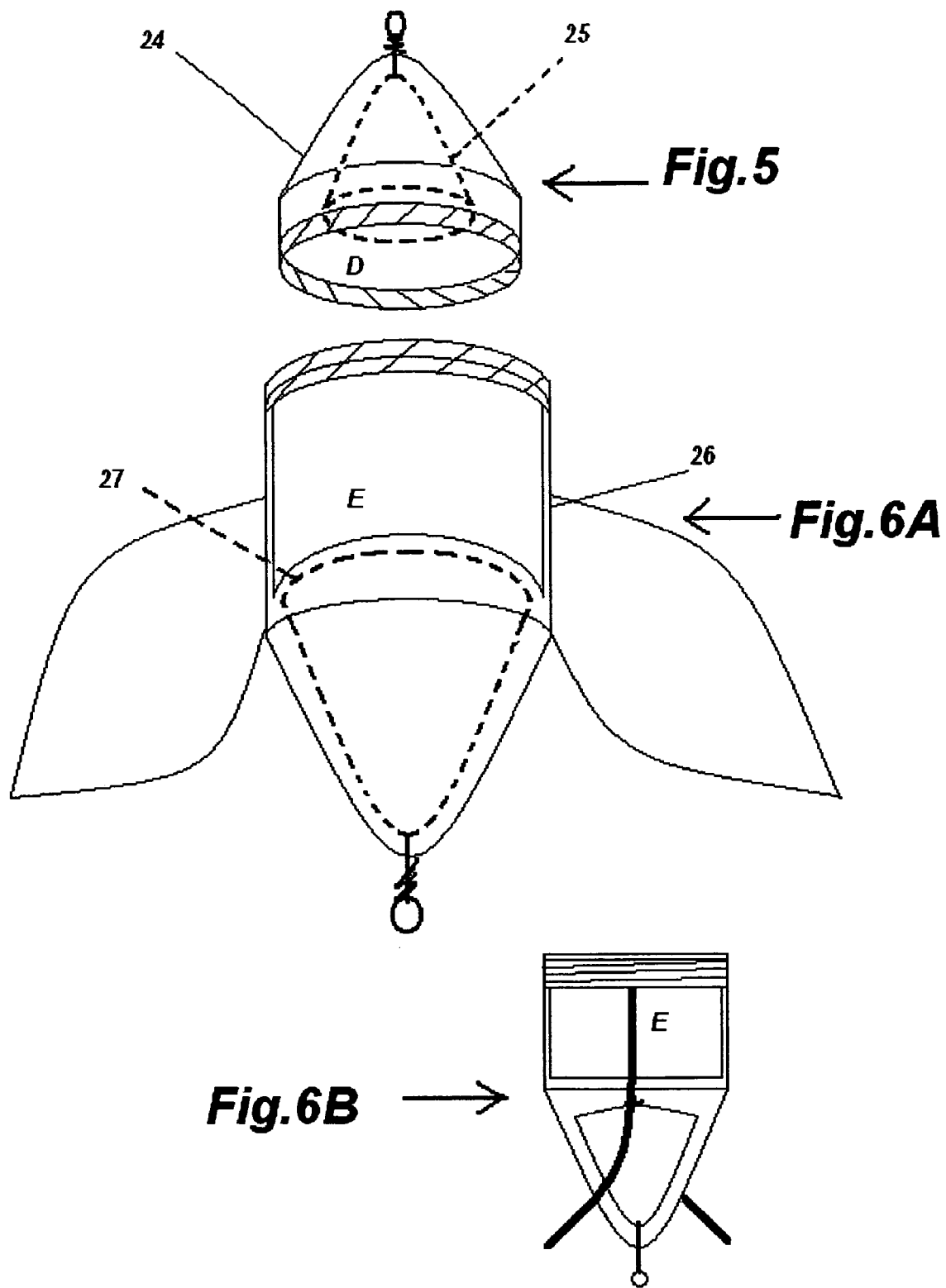

ILLUMINATING SCENT RELEASE FISHING LURE

BACKGROUND OF INVENTION

The present invention relates generally to fishing equipment, and more particularly to illuminated and or scent releasing fishing lures.

SUMMARY OF THE INVENTION

The present invention discloses a fishing lure for attracting fish by means of a unique two part attracting system which the principal object of is to provide a fishing lure that embodies both visual attractant and scent attractant in one fishing lure to allow the best chance of luring and catching fish.

DESCRIPTION OF ART WORKS 1 AND 2

A. Screw on tip of lure.
B. Main body and chamber of lure.
C. Bottom tail fin and chamber of lure.
D. Lead incased plastic tip.
E. Lead incased plastic tail fin.
1. Outer surface of Main tubular chamber that holds chemiluminescent ampoule.
2. Glass ampoule contained within tubular chamber of main body that holds chemiluminescent chemicals.
3. Screw threads.
4. Screw threads.
5. Rubber washer.
6. Screw threads.
7. Hole in tip of screw on cap for attaching swivel.
8. Rubber washer.
9. Top screw on cap of lure.
10. Main body of tail fin with tubular chamber within.
11. Sponge within smaller tail fin tubular chamber that retains liquid fish attractant.
12. Screw threads.
13. Upper water inlet hole of scent release chamber.
14. Lower scent release Hole of chamber.
15. Curved tail fin on lower scent release chamber.
16. Hole in tail fin for attaching fish hook.
17. Three dimensional drawing of main body of the lure that shows a tubular shape of which has a solid bottom and an opening at the top with a tubular cavity within.
18. Opening of main lure body chamber to remove and insert glass ampoule.
19. Opening of lower tail fin chamber to remove and insert scent and sponge.
20. Three dimensional view of lures main body of description 1. Where in broken lines indicate a hollow chamber.
21. Three dimensional view of lures main body of description 1. Where in crossing lines indicate a solid bottom with no opening.
22. Two dimensional view of the complete lure after main body along with bottom tail fin and top cap are connected.
23. A view of the bottom smaller scent release chambers with tail fins showing the fins are curved which cause the lure to spin in a clockwise direction when retrieved through the water.
24. Plastic top cap.
25. Lead weight incased in plastic top cap.
26. Plastic tail fin.
27. Lead weight incased in plastic tail fin

BRIEF DESCRIPTION OF DRAWINGS

FIG. 1 is a side, elevational view of a fishing lure in accordance with the present invention;

FIG. 2A is a side, elevational view of the main body of the fishing lure of FIG. 1;

FIG. 2B is a perspective view of the main body of the fishing lure of FIG. 2, showing the construction of the body in greater detail;

FIG. 3 is a side, elevational view of the top cap of the fishing lure of FIG. 1;

FIG. 4A is a side, elevational view of the tail portion of the fishing lure of FIG. 1;

FIG. 4B is a side, elevational view of the tail portion of the fishing lure of FIG. 1, rotated 90° from view of FIG. 4A so as to show the curvature of the fins of the tail portion in greater detail;

FIG. 5 is a perspective view of the top cap of FIG. 3;

FIG. 6A is a perspective view of a tail portion of a fishing lure in accordance with a second embodiment of the invention; and FIG. 6B is a side, elevational view of the tail portion of FIG. 6A, showing the curvature of the fins thereof in greater detail.

DESCRIPTION

A fishing lure comprised of a cap (A) of which has screw or similar type connecting threads (6) and two tubular hollow chambers (B) (C) with like threads (3) (4) (12) in which the main hollow chamber (B) contains a crushable glass ampoule (2) with colored chemiluminescent chemicals that produce illumination when mixed with a second activating chemical compound when said glass ampoule (2) is crushed inside the hollow tubular chamber (18) (20) and a second separate and smaller hollow tubular chamber (19) with curved tail fins (23) (15) that is connected to said first main chamber (B) by the screw on threads (4) located on the bottom portion of said first chamber thus creating a new chamber (19) that holds scented fish attractant oils and two (14) (13) small holes on the side of said second chamber that allow water to enter into the upper larger hole (13) and pass through a sponge or like fibrous material (11) that is soaked in fish attractant liquid then out of the second smaller hole (14) as it is spinning through the water and produces a trail of scent. The top cap (A) portion can also be connected together with the bottom tail (C) portion and used without the main body (B) of the lure as a separate scent releasing fish attractant lure on its own if so desired. The spinning motion is created due to the curved tail fins (23). The main body (B) of the lure is composed of polypropylene or like translucent durable plastic material the top cap (A) and lower fin (C) portion are composed of a metal or like material in (FIG. 1) or a plastic material that incases lead weights within (FIG. 2).

What is claimed is:

1. A fishing lure that has both a chemiluminescent chamber and scent attractant chamber that are connected in one lure to attract fish and which has a lead incased in plastic cap or tip which connects to the main body which is comprised of polypropylene material and has a hollow tubular chamber for housing a chemiluminescent ampoule and activating chemical and is connected by screw type threads to the tail portion of the lure which has a tubular hollow chamber within and curved tail fins and contains a sponge fibrous material which is immersed in fish attractant liquid, so that said lure will spin while being retrieved causing water to flow into a small hole at the top side portion of the bottom chamber and gradually extrude fish attractant out of a smaller hole at the bottom side portion of the said bottom hollow chamber to produce a trail of fish attractant oil or liquid as the lure is retrieved, wherein the two chambers and top cap of said lure are removable from one another by screw threading and wherein the bottom smaller hollow chamber can be used in conjunction with said cap composed of a lead weight incased in a durable plastic, to produce a single smaller lure to be used as a scent release lure and remain separate from the main hollow body chamber of the lure if so desired.

2. A fishing lure, comprising:
- a main body portion having a chamber for housing a light source;
- a cap portion mountable to a first end of said body portion and having a weight; and
- a tail portion mountable to a second end of said body portion and having a chamber for holding a supply of fish attractant, fins for causing said lure to spin as said lure is retrieved, and at least one outlet hole for releasing fish attractant from said chamber as said lure is retrieved;

said body, cap and tail portions being removable from one another and said cap portion being mountable to said tail portion so as to form a smaller, scent release lure that can be used separately from the main body portion if desired wherein the weight of said cap portion comprises a lead weight encased in durable plastic, and wherein the body, cap, and tail portions each comprise threaded connectors whereby said portions are detachably mountable to one another.

3. The fishing lure of claim 2, wherein said chamber in said main body portion comprises:
- a hollow tubular chamber for housing a chemiluminescent ampoule.

4. The fishing lure of claim 2, wherein said light source comprises:
- a battery-powered light source housed in said chamber in said main body portion.

5. The fishing lure of claim 2, wherein said tail portion further comprises:
- at least one inlet hole for allowing water to flow into said chamber in said tail portion and mix with said fish attractant as said lure is retrieved.

6. The fishing lure of claim 5, wherein said inlet hole in said tail portion is located fowardly of said outlet hole through which fish attractant is released from said tail portion.

7. The fishing lure of claim 1, wherein said fins of said tail portion comprises:
- a plurality of curved fins on said tail portion.

* * * * *